(12) United States Patent
Kao et al.

(10) Patent No.: US 10,783,293 B2
(45) Date of Patent: Sep. 22, 2020

(54) CIRCUIT DESIGN SYSTEM, CHECKING METHOD, AND NON-TRANSITORY COMPUTER READABLE MEDIUM THEREOF

(71) Applicant: Realtek Semiconductor Corporation, Hsinchu (TW)

(72) Inventors: Shu-Yi Kao, Zhubei (TW); Yu-Lan Lo, Jhubei (TW); Meng-Jung Lee, Taoyuan (TW); Yun-Jing Lin, Yilan (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 12 days.

(21) Appl. No.: 16/132,804

(22) Filed: Sep. 17, 2018

(65) Prior Publication Data
US 2019/0332726 A1    Oct. 31, 2019

(30) Foreign Application Priority Data

Apr. 27, 2018    (TW) .............................. 107114574 A

(51) Int. Cl.
*G06F 30/30*    (2020.01)
*G06F 30/327*    (2020.01)
(Continued)

(52) U.S. Cl.
CPC ........ *G06F 30/327* (2020.01); *G06F 2119/10* (2020.01); *G06F 2119/12* (2020.01)

(58) Field of Classification Search
CPC ...... G06F 30/33; G06F 13/16; G06F 13/4068; G06F 13/4265; G06F 30/392; G06F 30/39; G06F 30/394; G06F 30/331; G06F 30/3323; G06F 2119/12; G06F 30/327; G06F 2117/08; G06F 30/34; G06F 11/26; G06F 30/3312; G06F 13/22; G06F 13/4291; G06F 17/16; G06F 2111/08; G06F 2119/06; G06F 7/483; G06F 7/52; G06F 7/5443; G06F 2115/10; G06F 30/367; G06F 30/396; G06F 30/398; G06F 11/3644; G06F 15/7864; G06F 2009/45579; G06F 2009/45583; G06F 2009/45595; G06F 2119/10; G06F 30/30; G06F 9/45558;
(Continued)

(56) References Cited

U.S. PATENT DOCUMENTS 6,959,250 B1    10/2005  Shimazaki et al.
8,161,434 B2 *   4/2012  Gu ......................... G06F 30/33
                                                                                    716/103

(Continued)

*Primary Examiner* — Binh C Tat
(74) *Attorney, Agent, or Firm* — Locke Lord LLP; Tim Tingkang Xia, Esq.

(57) ABSTRACT

A checking method for checking whether a signal in a chip is interference-free, and the checking method includes the following operations: analyzing, by a processor, a netlist file to acquire a first node for outputting the signal in the chip, in which the netlist file is configured to describe a circuit architecture of the chip; searching, by the processor, candidate nodes associated with the signal according to the netlist file and the first node; and determining, by the processor, whether a first candidate node of the candidate nodes is connected to an anti-interference circuit, in order to check whether the signal is interference-free.

20 Claims, 5 Drawing Sheets

(51) Int. Cl.
*G06F 119/10* (2020.01)
*G06F 119/12* (2020.01)

(58) Field of Classification Search
CPC ............... G06F 9/5077; G16B 50/00; H03K 19/17736; H03K 19/02; H01L 27/0207; H01L 23/5225; H01L 24/49; H01L 2924/15174; G01R 31/318357; G01R 31/31705; G01R 31/2853; G01R 31/317; G01R 31/31717
USPC ................................................ 716/100–109
See application file for complete search history.

(56) References Cited

U.S. PATENT DOCUMENTS

| | | | | |
|---|---|---|---|---|
| 2002/0152060 | A1* | 10/2002 | Tseng | G06F 30/331 703/17 |
| 2009/0031268 | A1* | 1/2009 | Miranda | G06F 17/5031 716/113 |
| 2009/0210841 | A1* | 8/2009 | Prakash | G06F 17/5031 716/113 |
| 2011/0307233 | A1* | 12/2011 | Tseng | G06F 30/331 703/14 |
| 2015/0331981 | A1* | 11/2015 | Mulvaney | G06F 30/394 716/134 |

* cited by examiner

CIRCUIT DESIGN SYSTEM, CHECKING METHOD, AND NON-TRANSITORY COMPUTER READABLE MEDIUM THEREOF

RELATED APPLICATIONS

This application claims priority to Taiwan Application Serial Number 107114574, filed Apr. 27, 2018, which is herein incorporated by reference in its entirety.

BACKGROUND

Technical Field

The present disclosure relates to a circuit design system. More particularly, the present disclosure relates to a circuit design system and a checking method for checking an anti-interference circuit.

Description of Related Art

In practical applications, electronic circuits are interfered with noises. Theses noises are usually introduced from different sources (e.g., crosstalk between signal lines, transient delay of a logic gate, mutual inductance between different circuits, etc.). If the interferences are too large, operations of circuits may fail. A circuit designer may manually check whether signals in a chip would be interfered. However, if the number of the circuits in the chip is too large, it is not able to check these signals efficiently and accurately.

SUMMARY

Some aspects of the present disclosure are to provide a circuit design system that includes a memory and a processor. The memory is configured to store a plurality of program codes. The processor is configured to execute the plurality of program codes to: analyze a netlist file to acquire a first node for outputting a signal in a chip to which the netlist file corresponds; search a plurality of candidate nodes associated with the signal according to the netlist file and the first node; and determine whether a first candidate node of the plurality of candidate nodes is connected to an anti-interference circuit, in order to check whether the signal is interference-free.

Some aspects of the present disclosure are to provide a checking method for checking whether a signal in a chip is interference-free, and the checking method includes the following operations: analyzing a netlist file by a processor to acquire a first node for outputting the signal in the chip, wherein the netlist file is configured to describe a circuit architecture of the chip; searching by the processor, for obtaining a plurality of candidate nodes associated with the signal according to the netlist file and the first node; and determining by the processor, whether a first candidate node of the plurality of candidate nodes is connected to an anti-interference circuit, in order to check whether the signal is interference-free.

Some aspects of the present disclosure are to provide a non-transitory computer readable medium having a computer program which, when executed by a processor, result in the processor performing operations including: analyzing a netlist file to acquire a first node for outputting a signal in a chip to which the netlist file corresponds; searching a plurality of candidate nodes associated with the signal according to the netlist file and the first node; and determining whether a first candidate node of the plurality of candidate nodes is connected to an anti-interference circuit, in order to check whether the signal is interference-free.

As described above, the circuit design system and the checking method in the present disclosure are able to efficiently check whether signals in a chip or in an integrated circuit are correctly configured with an anti-inference circuit, in order to assure correct circuit operations.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present embodiments. Furthermore, for simplifying the drawings, some of the conventional structures and elements are shown with schematic illustrations.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other.

Figure 1:
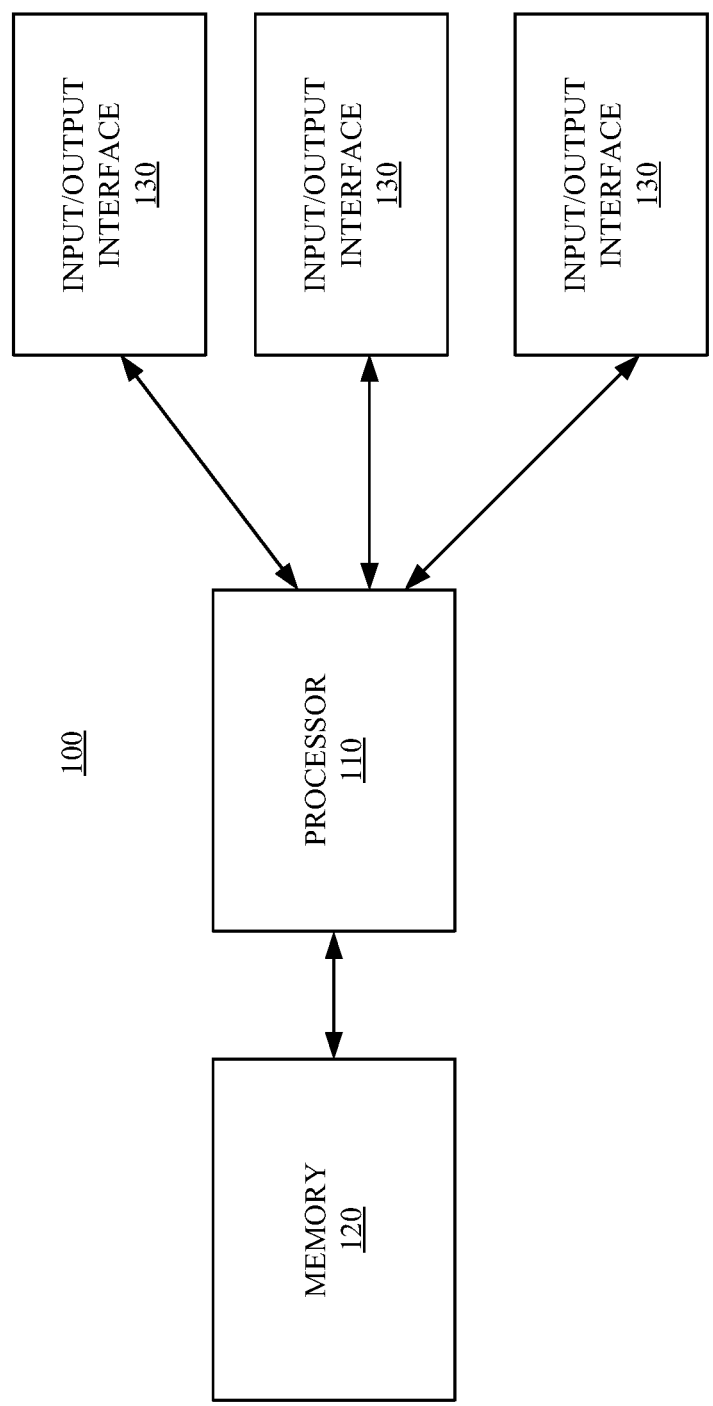
FIG. 1 is a circuit design system according to some embodiments of the present disclosure.

Reference is made to FIG. 1. FIG. 1 is a circuit design system 100 according to some embodiments of the present disclosure. The circuit design system 100 includes a processor 110, a memory 120, and one or more input/output (I/O) interfaces 130. The processor 110 is coupled to the memory 120 and the I/O interfaces 130. In various embodiments, the processor 110 is a central processing unit (CPU), an application specific integrated circuit (ASIC), a multi-processor, a distributed processing system, or a suitable processing unit. Various circuits or units to implement the processor 110 are within the contemplated scope of the present disclosure.

The memory 120 stores one or more program codes for aiding design of integrated circuits. For example, the memory 120 stores one or more program codes encoded with instruction sets for checking whether an anti-interference circuit is arranged in a chip or in an integrated circuit.

The processor 110 may execute the program codes stored in the memory 120, and thus operations (as discussed in FIG. 4 below) for checking the anti-interference circuit can be automatically performed.

In some embodiments, the memory 120 is a non-transitory computer readable storage medium encoded with, i.e., storing, a set of executable instructions for checking anti-interference circuits. For illustration, the memory 120 stores executable instructions for performing operations including, for example, operations illustrated in FIG. 4. In some embodiments, the computer readable storage medium is an electronic, magnetic, optical, electromagnetic, infrared, and/or a semiconductor system (or apparatus or device). For example, the computer readable storage medium includes a semiconductor or solid-state memory, a magnetic tape, a removable computer diskette, a random access memory (RAM), a read-only memory (ROM), a rigid magnetic disk, and/or an optical disk. In one or more embodiments using optical disks, the computer readable storage medium includes a compact disk-read only memory (CD-ROM), a compact disk-read/write (CD-R/W), and/or a digital video disc (DVD).

The I/O interfaces 130 receive various inputs or commands from various control devices, which, for example, are manipulated by a circuit designer. Accordingly, the circuit design system 100 can be manipulated with the inputs t or the commands received by the I/O interfaces 130. For example, the circuit designer may input data carrying a netlist file of an integrated circuit via the I/O interfaces 130 to the processor 110 for further analyzing.

In some embodiments, the I/O interfaces 130 include a monitor configured to display the status of executing the program code. In some embodiments, the I/O interfaces 130 include a graphical user interface (GUI). In some other embodiments, the I/O interfaces 130 include a keyboard, keypad, mouse, trackball, track-pad, touch screen, cursor direction keys, or the combination thereof, for communicating information and commands to processor 110.

In order to illustrate the checking method of FIG. 4 below, various related terms or elements are described with reference to FIG. 2A to FIG. 3B.

Figure 2A:
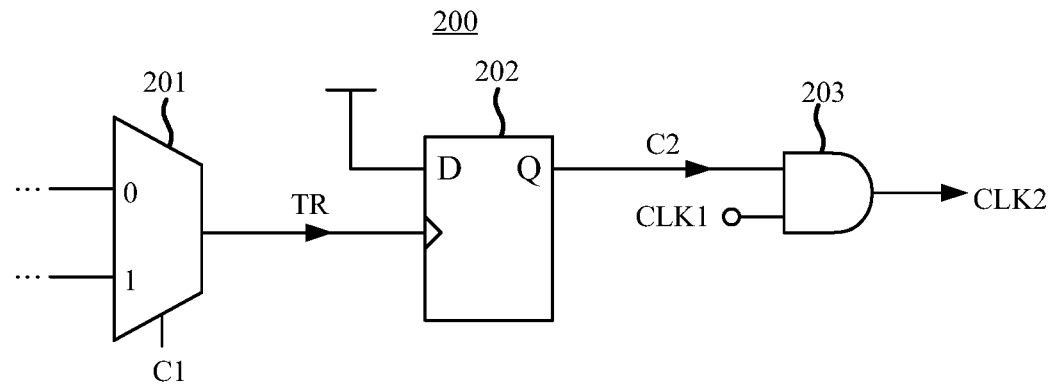
FIG. 2A is a schematic diagram of a circuit according to some embodiments of the present disclosure.
Figure 2B:
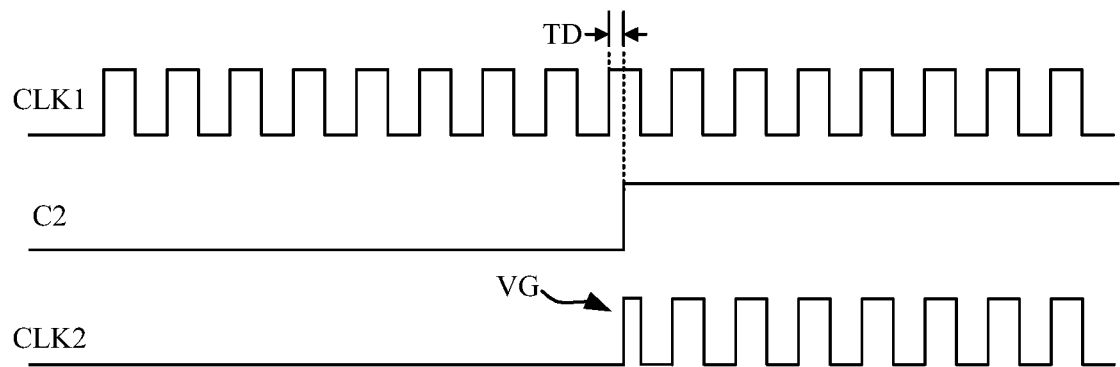
FIG. 2B is a schematic diagram of signal waveforms in FIG. 2A according to some embodiments of the present disclosure.

FIG. 2A is a schematic diagram of a circuit 200 according to some embodiments of the present disclosure, and FIG. 2B is a schematic diagram of waveforms of signals in FIG. 2A according to some embodiments of the present disclosure.

In some embodiments, the term "interference" in this document may indicate unpredictable transient faults or noises occurred on electrical signals. For example, when an electrical signal passes through a digital logic circuit (e.g., the circuit 200 in FIG. 2A) or an I/O circuit of a chip, certain delay time may be introduced to cause a glitch in the processing process. As shown in FIG. 2B, a glitch VG is a pulse with short interval which often lead to a circuit failure or a design error.

For ease of understanding, FIG. 2A is described with a clock signal as an example, but the present disclosure is not limited thereto. The circuit 200 includes a multiplexer 201, a flip-flop 202, and an AND gate 203. If a control signal C1 has a logic value of 1, the multiplexer 210 outputs a trigger signal TR to the flip-flop 202. The flip-flop 202 is triggered based on the trigger signal TR to generate a control C2 to the AND gate 203. As a result, the AND gate 203 may output a clock signal CLK2 according to the control signal C2 and a clock signal CLK1. As shown in FIG. 2B, if the control signal C2 is not synchronized to the clock signal CLK1 due to a delay TD, the glitch VG will occur on the clock signal CLK2.

Figure 3A:
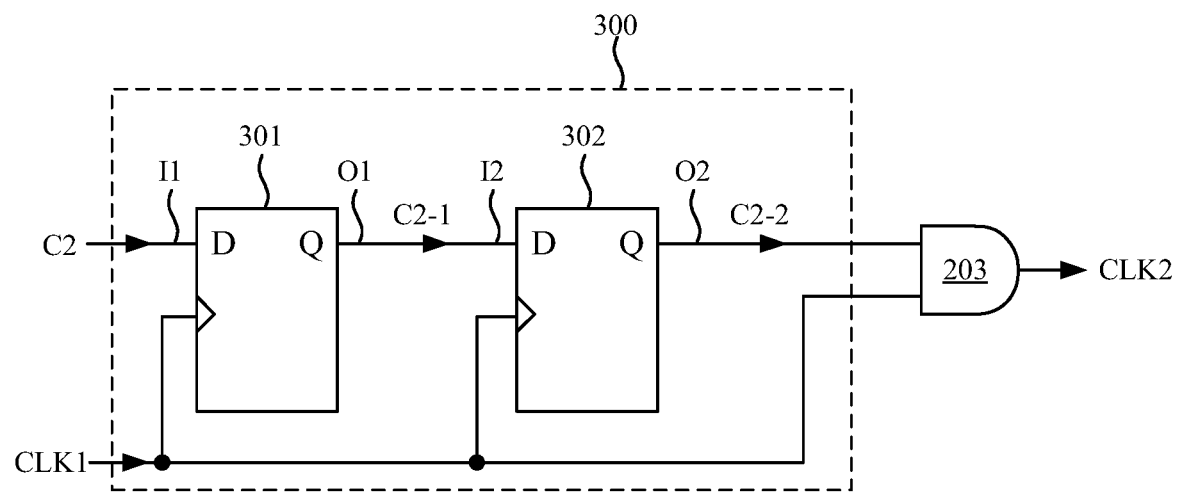
FIG. 3A is an anti-interference circuit according to some embodiments of the present disclosure.

FIG. 3A is an anti-interference circuit 300 according to some embodiments of the present disclosure. For ease of understanding, like elements in FIG. 3A are designated with the same reference numbers with respect to FIGS. 2A and 2B. In order to remove impacts from the glitch VG, the anti-interference circuit 300 in FIG. 3A can be employed in the circuit 200.

As shown in FIG. 3A, the anti-interference circuit 300 includes a flip-flop 301 and a flip-flop 302. An input terminal I1 of the flip-flop 301 is configured to receive the control signal C2, and an output terminal O1 of the flip-flop 301 is configured to output a control signal C2-1. The flip-flop 301 is configured to be triggered by the clock signal CLK1, in order to output the control signal C2-1 based on the control signal C2. An input terminal I2 of the flip-flop 302 is coupled to the output terminal O1 of the flip-flop 301 to receive the control signal C2-1, and an output terminal O2 of the flip-flop 302 is configured to output a control signal C2-2 to the AND gate 203. The flip-flop 302 is configured to be triggered by the clock signal CLK1, in order to output the control signal C2-2 based on the control signal C2-1. Accordingly, the AND gate 203 of the circuit 200 is able to output the clock signal CLK2 according to the control signal C2-2 and the clock signal CLK1.

In some embodiments, the clock signal CLK1 received by the flip-flop 301 and the clock signal CLK1 received by the flip-flop 302 may be the same signal, but the present disclosure is not limited thereto. For example, in some other embodiments, the clock signal CLK1 received by the flip-flop 301 and the clock signal CLK1 received by the flip-flop 302 may be different clock signals from the same signal source.

In some embodiments, if the period of the clock signal CLK1 is longer than a sum of the meta-stability resolution time and the setup time of the flip-flop 302, the control signal C2-2 outputted by the flip-flop 302 will be synchronized to the clock signal CLK1. As a result, the AND gate 203 is able to output a glitch-free and synchronized clock signal CLK2.

The above example of using two flip-flops is given for illustrative purposes, but the present disclosure is not limited thereto. Various types of the anti-interference circuit can be employed to implement the anti-interference circuit 300. For example, in some embodiments, the anti-interference circuit 300 may only include a single flip-flop. Alternatively, in some other embodiments, the anti-interference circuit 300 may be implemented with a signal processing signal having a function of first-in and first-out (FIFO). In various embodiments, by checking whether a node that outputs a signal is correctly connected to an anti-interference circuit, whether the signal is interference-free can be confirmed.

Figure 3B:
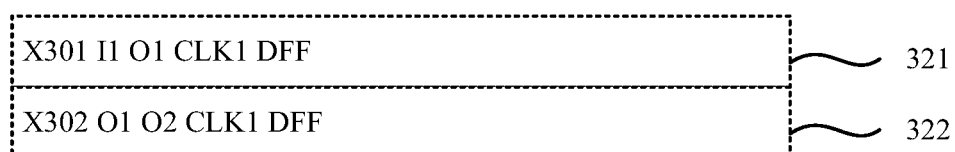
FIG. 3B is a schematic diagram of a netlist file describing the anti-interference circuit 300 in FIG. 3A, according to some embodiments of the present disclosure.

FIG. 3B is a schematic diagram of a netlist file 320 describing the anti-interference circuit 300 in FIG. 3A, according to some embodiments of the present disclosure. In some embodiments, the processor 110 is able to perform a design tool to compile the netlist file 320, in order to acquire the circuit architecture of the anti-interference circuit 300. As described above, in some embodiments, the processor 110 is able to analyze the data carrying the netlist file received from the I/O interfaces 130, in order to check whether the anti-interference circuit is employed in the chip or in the integrated circuit.

In some embodiments, a circuit designer is able to design the circuit by describing the anti-interference circuit 300 through the netlist file 320. In some embodiments, the content of the netlist file 320 are in compliance with a predetermined type of syntax, which is able to record and/or design a circuit in a descriptive format recognizable by the circuit design system 100. In some embodiments, the predetermined type of syntax is BERKELEY SPICE syntax. In some other embodiments, the predetermined type of syntax is HSPICE syntax. The above types of syntax are given for illustrative purposes, and the present disclosure is not limited thereto.

In some embodiments, the netlist file 320 is configured to describe connections of each node of transistors and/or active (and/or passive) elements in one or more circuits (e.g., the circuit 200 and the anti-interference circuit 300). For example, the netlist file 320 includes a description 321 and a description 322. In the description 321, "X" of X301 is used to invoke a predefined sub-circuit DFF, and the "301" indicates the device name of this description (corresponds to the flip-flop 301 in FIG. 3A in this example). In addition, the sub-circuit DFF corresponds to an internal structure of a single flip-flop, and sequentially defines an input terminal and an output terminal thereof. For example, in the description 321, "I1" is used to define the input terminal I1 of the flip-flop 301, and "O1" is used to define the output terminal O1 of the flip-flop 301, and "CLK1" is used to define that the flip-flop 301 is triggered by the clock signal CLK1. In some embodiments, the sub-circuit DFF may be predefined in the netlist file 320 with a statement of ".subckt," but the present disclosure is not limited thereto.

Similarly, in the description 322, "X302" indicates the device name of this description (corresponds to the flip-flop 302 in FIG. 3A in this example), "O1" is used to define that the input terminal I2 of the flip-flop 302 is connected to the output terminal O1 of the flip-flop 301, "O2" is used to define the output terminal O2 of the flip-flop 302, and "CLK1" is used to define that the flip-flop 302 is triggered by the clock signal CLK1.

In some embodiments, a circuit designer may build and/or edit the netlist file 320 via the circuit design system 100. In some embodiments, the memory 120 stores one or more program codes that can be performed to perform a circuit simulation and analysis (e.g., the method 400 below) according to the netlist file 320. The netlist file 320 in FIG. 3B is given for illustrative purposes, and the present disclosure is not limited thereto. In different embodiments, the netlist file 320 may include more descriptions to define overall connections and signals configurations (e.g., the clock signal CLK1 is configured to trigger the flip-flops 301-302) of a chip or an integrated circuit.

Figure 4:
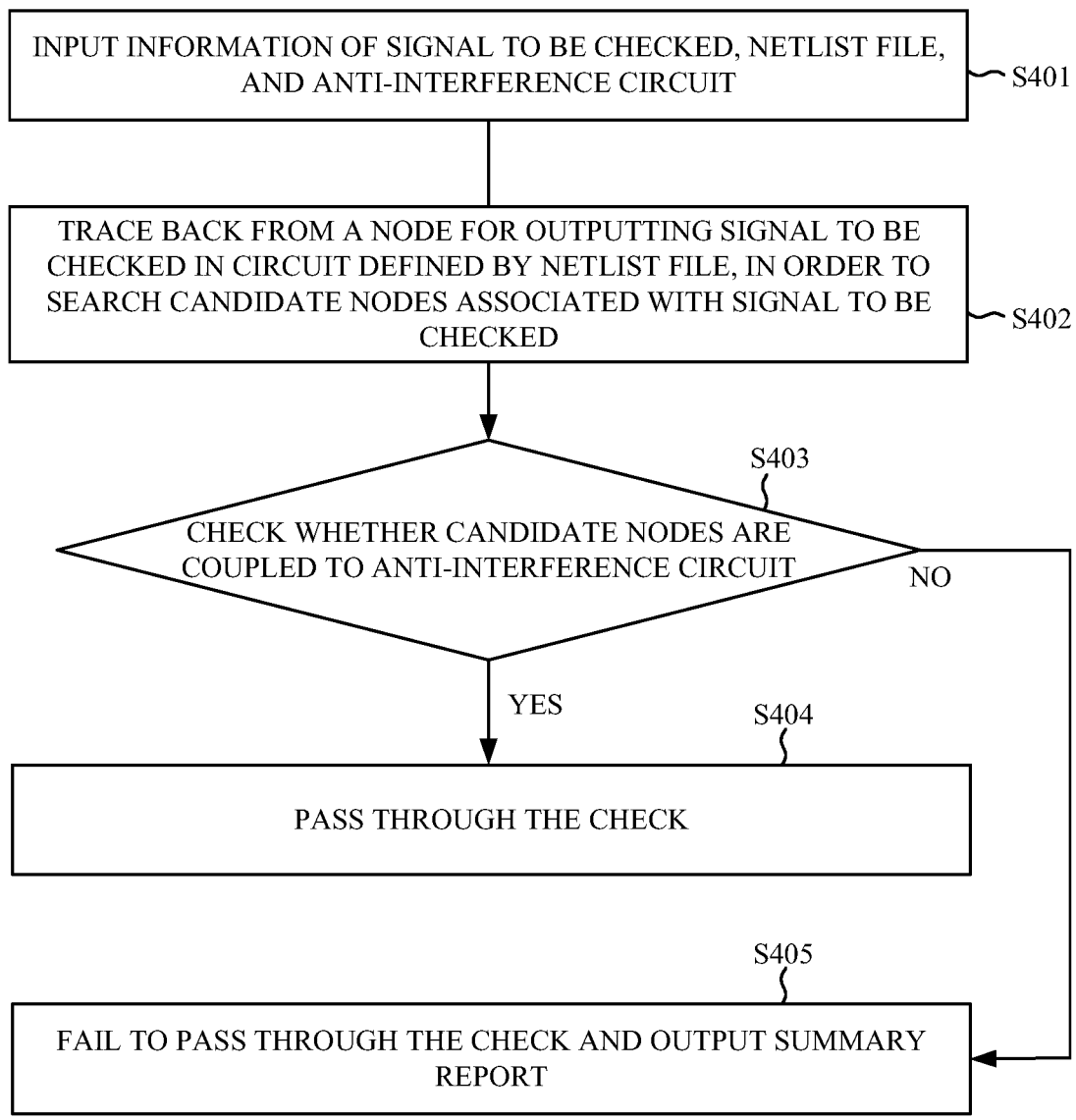
FIG. 4 is a flowchart of a checking method according to some embodiments of the present disclosure.

FIG. 4 is a flowchart of a checking method 400 according to some embodiments of the present disclosure. For ease of understanding, the checking method 400 is described with reference to the circuit design system 100, the anti-interference circuit 300, and the netlist file 320.

In operation S401, inputting information of a signal to be checked, a netlist file, and an anti-interference circuit. For example, the circuit design system 100 is able to receive command(s) and data carrying the netlist file and the anti-interference circuit, in which the command(s) is for assigning a type of signals expected to be checked (e.g., a clock signal). In some embodiments, the circuit design system 100 may automatically check whether nodes, which coupled to I/O pads, in a chip are connected to the anti-interference circuit.

In operation S402, tracing back from a node for outputting the signal to be checked in a circuit defined by the netlist file, in order to search candidate nodes associated with the signal to be checked.

Figure 5:
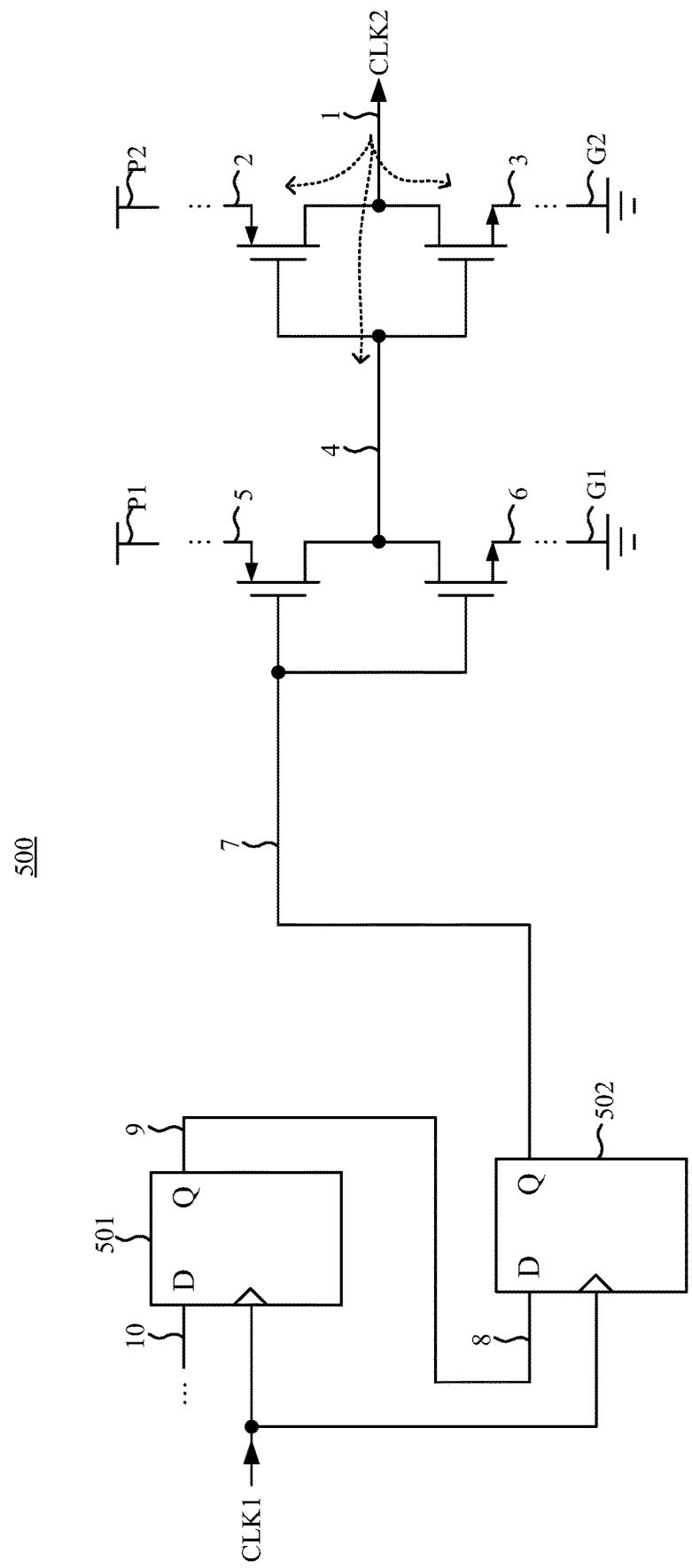
FIG. 5 is a schematic diagram illustrating partial circuits in a chip according to some embodiments of the present disclosure.

For ease of illustrating operation S402, reference is made to FIG. 5. FIG. 5 is a schematic diagram illustrating partial circuits in a chip 500 according to some embodiments of the present disclosure. If the overall circuit defined by the netlist file 320 corresponds to the chip 500, the processor 110 is able to acquire connections in the partial circuit in the chip 500, as shown in FIG. 5 when compiling the netlist file 320.

In operation S401, the processor 110 acquires a type of a signal to be checked is a clock signal. Accordingly, after analyzing the netlist file 320, the processor 110 acquires that the node for outputting the clock signal CLK2 is node 1. Thus, the processor 110 traces back from the node 1 to circuits, which may be associated with the clock signal CLK2, in the chip 500 (i.e., the dotted line paths), in order to search the candidate nodes. As shown in FIG. 5, the processor 110 may acquire that all nodes 2-10 coupled to the node 1 are candidate nodes based on information of the netlist file 320. In some embodiments, the processor 110 is able to exclude power nodes P1-P2 and ground nodes G1-G2 in the netlist file 320 from the candidate nodes. In other words, in the progress of tracing to circuits may be associated with the clock signal CLK2 in the chip 500, the processor 110 is able to directly skip all power nodes and ground nodes in the chip 500, in order to expedite the execution speed of operation S402.

With continued reference to FIG. 4, in operation S403, checking whether the candidate nodes are coupled to the anti-interference circuit. If the candidate nodes are coupled to the anti-interference circuit, operation S404 is performed; otherwise, operation S405 is performed. In operation S404, determining that the signal to be checked passes the check. In operation S405, determining that the signal to be check fails to pass the check, and outputting a summary report.

In some embodiments, in operation S403, the processor 110 may sequentially check the candidate nodes according to circuit architecture of the anti-interference circuit, in order to determine whether the candidate nodes are connected to the anti-interference circuit. For example, as noted above, the anti-interference circuit 300 includes two flip-flops 301 and 302, in which the output terminal of the flip-flop 302 is associated with the clock signal CLK2, and the input terminal of the flip-flop 302 is coupled to the output terminal of the flip-flop 301. Thus, the processor 110 may determine whether any one of the candidate nodes is coupled to an output terminal of a flip-flop at first, then determine whether an input terminal of the same flip-flop is coupled to an output terminal of another flip-flop.

For example, as shown in FIG. 5, it can be acquired that, based on the netlist file 320, the candidate node 7 is connected to an output terminal of the flip-flop 502, and an input terminal (i.e., the candidate node 8) of this flip-flop 502 is connected to an output terminal (i.e., the candidate node 9) of a flip-flop 501. Accordingly, the processor 110 may determine that the node 1 for outputting the clock signal CLK2 is connected to the anti-interference circuit 300, and thus determine that the clock signal CLK2 passes through the check (i.e., operation S404). By sequentially checking the candidate nodes based on the circuit architecture of the anti-interference circuit 300, it is able to remove one or more nodes, which are not connected to the partial circuit (e.g., the flip-flop 502) of the anti-interference circuit 300 of the candidate nodes. As a result, the execution speed of operation S403 is able to be expedited.

In some embodiments, if the clock signal CLK2 fails to pass through the check (i.e., the node 1 for outputting the clock signal CLK2 is not determined to be connected to the anti-interference circuit 300), the processor 110 is able to output the summary report. In some embodiments the summary report includes information regarding the check result, the node 1, the configurations of the candidate nodes 2-10, etc, for the circuit designer to perform further check.

The checking method 400 is described with reference to a clock signal for illustrative purposes, but the present disclosure is not limited thereto. In different embodiments, the checking method 400 is able to be applied to check various types of signals.

In some embodiments, the checking method 400 may be implemented as a design tool carried on a non-transitory computer readable medium. In other words, the checking method 400 may be implemented in hardware, software, firmware, and the combination thereof. For illustration, if speed and accuracy are determined to be paramount, a mainly hardware and/or firmware vehicle is selected and utilized. Alternatively, if flexibility is paramount, a mainly software implementation is selected and utilized. The above implementations are given for illustrative purposes, and the present disclosure is not limited thereto.

As described above, the circuit design system and the checking method in the present disclosure are able to efficiently check whether signals in a chip or in an integrated circuit are correctly configured with an anti-inference circuit, in order to assure correct circuit operations.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A circuit design system, comprising:
a memory configured to store a plurality of program codes; and
a processor configured to execute the plurality of program codes to:
analyze a netlist file to acquire a first node for outputting a signal in a chip to which the netlist file corresponds;
exclude at least one power node and at least one ground node in the netlist file so as to search a plurality of candidate nodes associated with the signal according to the netlist file and the first node; and
determine whether a first candidate node of the plurality of candidate nodes is connected to an anti-interference circuit, in order to check whether the signal is interference-free,
wherein the processor is further configured to determine whether the signal is not interference-free, wherein if the processor determines that the signal is not interference-free, the processor outputs a summary report regarding the anti-interference circuit.

2. The circuit design system of claim 1, wherein the processor is configured to analyze the netlist file to trace back from the first node to at least one partial circuit associated with the signal in the chip, in order to search the plurality of candidate nodes associated with the signal.

3. The circuit design system of claim 2, wherein the plurality of candidate nodes are coupled to the first node.

4. The circuit design system of claim 2, wherein the at least one partial circuit excludes the at least one power node and the at least one ground node in the chip.

5. The circuit design system of claim 1, wherein the processor is configured to sequentially check the plurality of candidate nodes based on a circuit architecture of the anti-interference circuit, in order to check whether the first candidate node is connected to the anti-interference circuit.

6. The circuit design system of claim 1, wherein the anti-interference circuit comprises a first flip-flop and a second flip-flop, and to check whether the first candidate node is connected to the anti-interference circuit, the processor is configured to:
check whether the first candidate node is connected to an output terminal of the second flip-flop according to the netlist file;
check whether an input terminal of the second flip-flop is coupled to an output terminal of the first flip-flop according to the netlist file if the first candidate node is connected to the output terminal of the second flip-flop; and
determine that the signal is interference-free if the input terminal of the second flip-flop is connected to the output terminal of the first flip-flop.

7. The circuit design system of claim 6, wherein if the first candidate node is not connected to the output terminal of the second flip-flop or if the input terminal of the second flip-flop is not connected to the output terminal of the first flip-flop, the processor is configured to determine that the signal is not interference-free.

8. The circuit design system of claim 1, wherein the signal is a clock signal.

9. A checking method for checking whether a signal in a chip is interference-free, the checking method comprising:
analyzing, by a processor, a netlist file to acquire a first node for outputting the signal in the chip, wherein the netlist file is configured to describe a circuit architecture of the chip;
excluding at least one power node and at least one ground node in the netlist file so as to search, by the processor, a plurality of candidate nodes associated with the signal according to the netlist file and the first node;
determining, by the processor, whether a first candidate node of the plurality of candidate nodes is connected to an anti-interference circuit, in order to check whether the signal is interference-free;
determining, by the processor, whether the signal is not interference-free; and
outputting, by the processor, a summary report regarding the anti-interference circuit if the processor determines that the signal is not interference-free.

10. The checking method of claim 9, wherein the anti-interference circuit comprises a first flip-flop and a second flip-flop, and determining whether the first candidate node is connected to the anti-interference circuit comprises:
checking whether the first candidate node is connected to an output terminal of the second flip-flop according to the netlist file;
checking whether an input terminal of the second flip-flop is coupled to an output terminal of the first flip-flop according to the netlist file if the first candidate node is connected to the output terminal of the second flip-flop; and
determining that the signal is interference-free if the input terminal of the second flip-flop is connected to the output terminal of the first flip-flop.

11. The checking method of claim 10, wherein if the first candidate node is not connected to the output terminal of the second flip-flop or if the input terminal of the second flip-flop is not connected to the output terminal of the first flip-flop, determining that the signal is not interference free.

12. The checking method of claim 9, wherein searching the plurality of candidate nodes comprises:
analyzing the netlist file to trace back from the first node to at least one partial circuit associated with the signal in the chip, in order to search the plurality of candidate nodes associated with the signal.

13. The checking method of claim 12, wherein the plurality of candidate nodes are coupled to the first node.

14. The checking method of claim 12, wherein the at least one partial circuit excludes the at least one power node and the at least one ground node in the chip.

15. The checking method of claim 9, wherein determining whether the first candidate node is connected to the anti-interference circuit comprises:
   sequentially checking the plurality of candidate nodes based on a circuit architecture of the anti-interference circuit, in order to check whether the first candidate node is connected to the anti-interference circuit.

16. A non-transitory computer readable medium having a computer program which, when executed by a processor, result in the processor performing a plurality of operations comprising:
   analyzing a netlist file to acquire a first node for outputting a signal in a chip to which the netlist file corresponds;
   excluding at least one power node and at least one ground node in the netlist file so as to search a plurality of candidate nodes associated with the signal according to the netlist file and the first node;
   determining whether a first candidate node of the plurality of candidate nodes is connected to an anti-interference circuit, in order to check whether the signal is interference-free;
   determining whether the signal is not interference-free; and
   outputting a summary report regarding the anti-interference circuit if it is determined that the signal is not interference-free.

17. The non-transitory computer readable medium of claim 16, wherein searching the plurality of candidate nodes comprises:
   analyzing the netlist file to trace back from the first node to at least one partial circuit associated with the signal in the chip, in order to search the plurality of candidate nodes associated with the signal.

18. The non-transitory computer readable medium of claim 17, wherein the plurality of candidate nodes are coupled to the first node, and the partial circuit excludes the at least one power node and the at least one ground node in the chip.

19. The non-transitory computer readable medium of claim 17, wherein the anti-interference circuit comprises a first flip-flop and a second flip-flop, and determining whether the first candidate node is connected to the anti-interference circuit comprises:
   checking whether the first candidate node is connected to an output terminal of the second flip-flop according to the netlist file;
   checking whether an input terminal of the second flip-flop is coupled to an output terminal of the first flip-flop according to the netlist file if the first candidate node is connected to the output terminal of the second flip-flop; and
   determining that the signal is interference-free if the input terminal of the second flip-flop is connected to the output terminal of the first flip-flop.

20. The non-transitory computer readable medium of claim 19, wherein if the first candidate node is not connected to the output terminal of the second flip-flop or if the input terminal of the second flip-flop is not connected to the output terminal of the first flip-flop, determining that the signal is not interference-free.

* * * * *